March 21, 1944.  H. W. COLLINS  2,344,601
TREATMENT OF FIBROUS GLASS
Filed Feb. 27, 1941  2 Sheets-Sheet 1
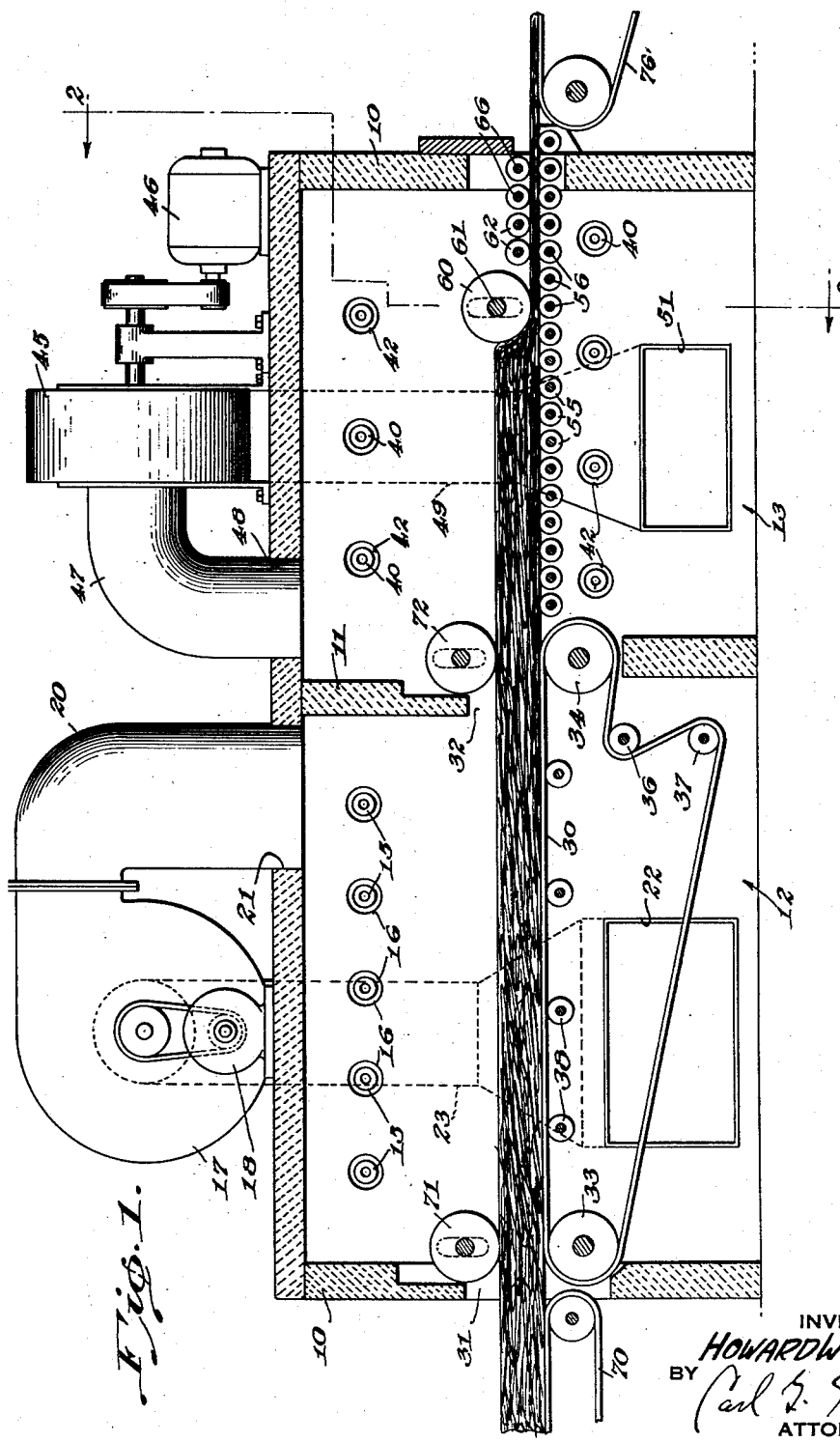
INVENTOR
HOWARD W. COLLINS
BY
ATTORNEY March 21, 1944.  H. W. COLLINS  2,344,601
TREATMENT OF FIBROUS GLASS
Filed Feb. 27, 1941   2 Sheets-Sheet 2
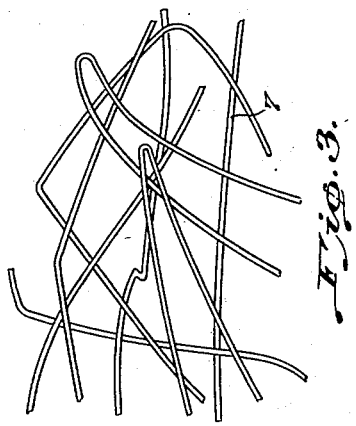
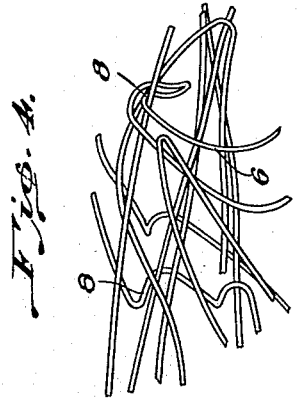
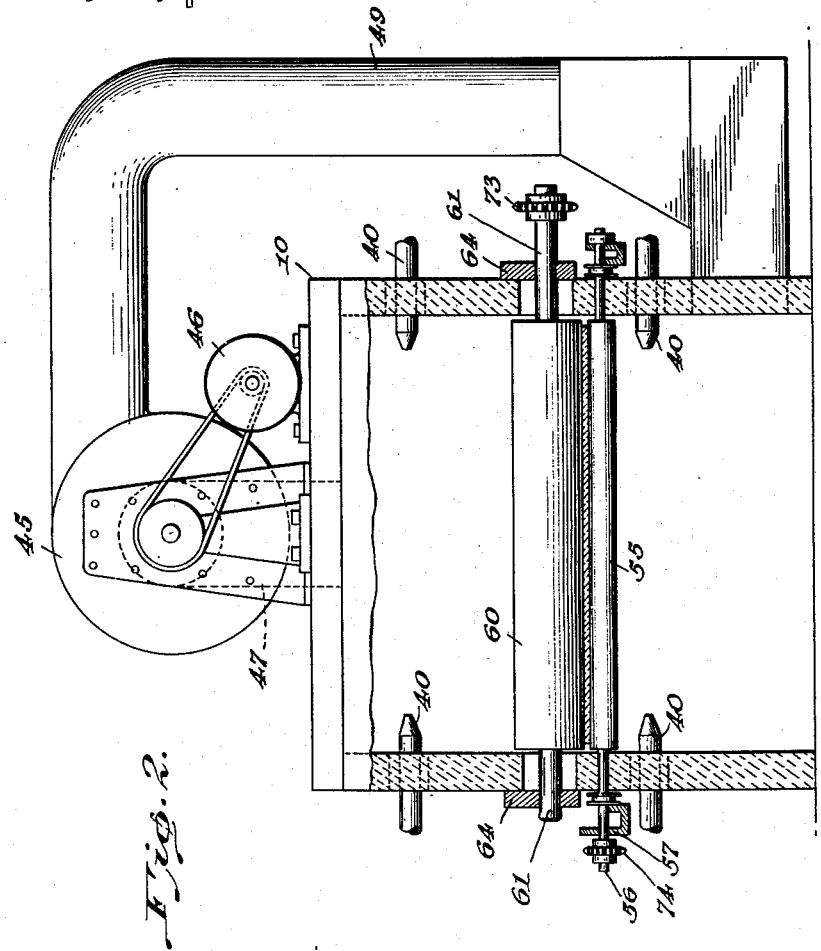
INVENTOR
HOWARD W. COLLINS
BY
ATTORNEY Patented Mar. 21, 1944

2,344,601

UNITED STATES PATENT OFFICE 2,344,601

TREATMENT OF FIBROUS GLASS

Howard W. Collins, Newark, Ohio, assignor to Owens-Corning Fiberglas Corporation, a corporation of Delaware Application February 27, 1941, Serial No. 380,860

3 Claims. (Cl. 49—77)

The present invention relates to fibrous glass products and to a method and apparatus for making the same. It relates particularly to hot-molded fibrous glass bats or similar articles.

The invention provides a method for forming fibrous glass into desired shapes and configurations and compacting it to substantially any required density. It is applicable to produce, for example, insulating boards of very high density and of accurate predetermined dimensions which are resilient and tough and withstand flexing and deformation to a marked degree. Such insulating boards or bats are especially valuable for high temperature insulation. They afford good load-bearing and other structural and physical properties while providing efficient insulation.

At the present time, glass wool is produced by attenuating streams of molten glass by means of a gaseous blast as described in the Slayter and Thomas Patent 2,133,236. The fibers thus formed are long, fine and flexible, and when accumulated in a mat, result in a resilient, fluffy product. Several methods have been employed to form this and similar mineral fibrous material into high density bats. According to one method, a mat of loose glass fibers is heated to a temperature at which the fibers are softened sufficiently so that they can slump under their own weight and compact into a higher density mat. At the temperature employed, the fibers fuse or partially fuse together at their junctures and thus become relatively fixed, resulting in a rigid, relatively non-flexible mat.

Another method consists in placing a loose mass of glass fibers under relatively high compression to reduce it to the required density. Heat is applied to the fibers while the mass is held under compression so that the fibers lose their springiness and resilience and take a permanent set in the form they have been forced to take by the compression.

Both of these methods have limitations. The product of the first method is too rigid for certain applications. It may be injured by marked flexing or deformation because the fibers in the bat fused or partially fused together are incapable of relative movement.

The second method has the disadvantage that the final density of the product is limited by the amount of pressure that can be applied to the fibrous mat in practice. For example, to obtain a finished bat of 12 pounds per cubic foot density, pressure of several hundred pounds per square inch is required to compress the loose mat. Any mechanism employed to exert this pressure on the mat is subjected to the same high temperatures up to the softening temperature of the glass in the mat, which is usually in the neighborhood of from 900 to 1200° F. Such mechanism must be designed to maintain this high pressure throughout the time the glass is being heated. This presents serious problems in construction of apparatus and makes it impracticable to obtain the higher densities desired. Another disadvantage of this method resides in the fact that in attempting to forcibly compress the mat while cold to the extent required, many of the fibers are broken, thereby deleteriously affecting the coherence and other physical properties of the product. In still another method of producing compacted fibrous glass, as disclosed in British Patent No. 475,464, the fibers are heated to the softening temperature but short of the fusing or sintering temperature and the mass of fibrous material is then compressed between screens or by means of suitable rolls.

It is an object of the present invention to provide a highly efficient process for heating masses of fibrous glass to produce a fibrous glass bat or other product of substantially any desired density and configuration.

It is a further object of the invention to provide a process for heating the fibrous glass to the exact temperature required at a high rate. This is accomplished by applying the heat in at least two stages, in the first of which the temperature of the glass is brought up to a point near but just short of the softening temperature, and in the second of which the final increment of heat is added to cause the glass to soften. In this way, much better control of the final temperature is secured.

It is a still further object to enable relatively high velocities of heated air to be passed through the fibrous glass without disarranging the fibrous material, to greatly increase the rate of heating. The invention provides the passage of heated air through the fibrous glass in the first heating zone in a direction urging the fibers toward a conveyor or other supporting surface so that high velocities of air may be utilized to apply large amounts of heat to the fibers while the fibrous glass is backed up by the supporting surface. In the second zone, where only small amounts of heat need be applied, the direction of heated air through the fibrous glass is reversed, serving to provide uniformity of heating throughout the thickness of the fibrous body. Although the direction of the heated air tends to lift the fibers from the conveyor, little or no actual displacement or disarrangement of the fibrous body results because the velocities of the air may be relatively low and yet heat the fibers the small additional amount required in this second zone.

In the drawings:

Figure 1 is a diagrammatic longitudinal sectional view of an apparatus adapted to perform the method of the present invention.

Figure 2 is a cross-sectional view of the same taken on the line 2—2 of Figure 1.

Figure 3 is a schematic representation on a greatly enlarged scale of a portion of a mat before treatment in accordance with the present invention.

Figure 4 is a similar view on a greatly enlarged scale illustrating the disposition of fibers in the fibrous product of the present invention.

In accordance with the present invention, fibrous glass in the form of a loose fluffy mass is heated to a temperature at which the fibers will take a permanent set when bent or otherwise deformed. This temperature may be defined as one approaching but preferably just short of the temperature at which all the fibers in the mass will fuse or partially fuse together. At this temperature the fibers are plastic but still able to sustain their own weight. While the fibers are at this temperature the mass of fibrous glass is molded, shaped or compressed to the desired configuration or density and the product is then allowed to cool.

The glass wool is thus hot-molded into the required form without adverse effect on the physical properties of the wool. The temperature employed is below the fusion temperature of the glass, and the individual fibers remain separated and relatively movable, providing resilience and flexibility in the finished product. The fibers are able to sustain their own weight and the mat does not slump down so that substantially all the shaping and compacting may be effected by applied pressure. This permits an accurate control of the shaping desired.

The shaping or compressing of the plastic fibrous mass may be performed by a mold by which simple or intricate shapes may be imparted to the product, or by means of a pressing member of planular or other configuration, or by a roll or other suitable means.

In accordance with the preferred form of the invention for producing insulating boards, the plastic fibrous mass is fed under a roll by which it is condensed and compacted to desired extent. The plastic fibrous mass may be reduced to any desired reasonable density by exerting only a relatively small amount of pressure thereon. After being compressed the mass retains the form imparted thereto by the compression roll so that it is usually unnecessary to maintain pressure on the mass after it is compacted and while it cools.

Glass wool may be molded in accordance with the present invention as a continuous process as it leaves the fiberizing apparatus. The fibers as they are formed are deposited on a moving arresting surface as shown, for instance, in the Slayter Patent 2,133,235, or the Simison and Collins Patent 2,189,840. The mat of fibers coming from the fiberizing apparatus may be fed through a heated chamber to be raised to the desired temperature and then molded. In making higher density products of substantial thickness, it is desirable to provide a greater thickness of loose wool by building up a composite mat from a plurality of superimposed glass wool mats and then heating and molding the composite mat. The molding process of the present invention substantially obliterates the lines of division between the individual layers to provide a uniform, coherent, finished product.

The temperature to which the loose wool is heated will vary with different glass compositions and may also be varied for a particular glass within a relatively narrow range depending upon the speed of operation and upon the degree of compacting of the loose mass. The lower limit of this range is just above the temperature to which the glass fibers may be heated without substantial effect on their natural resilience, so that a mass of glass wool at this temperature will resume its original shape after being deformed. The upper limit of the range corresponds substantially to that temperature just below which the fibers will all, or substantially all, fuse or partially fuse together and the fibrous mass will compact and slump under its own weight.

In the manufacture of high density insulating boards, it has been found preferable to employ a temperature in the upper part of the range, that is, one that approaches but is short of the temperature at which the fibers will all fuse or partially fuse together. At this temperature, the fibers are sufficiently plastic to readily take a permanent set when deformed but are still capable of sustaining their own weight as shown by the fact that the mat substantially does not slump under the effect of gravity.

Working in the upper part of the range assures that thicker fibers in the mat will be softened sufficiently to permit their deformation and setting with the thinner fibers. Also, molding and compressing are carried out at lower pressures than if the temperature of the glass is in the lower portion of the range.

At the temperature employed a trifling number of the fibers may fuse or partially fuse together, but this fusion is generally caused by limits of uniformity in the heating with the apparatus employed, and is preferably completely absent but may be present in such small proportions as not to affect the properties of the product as a whole. Temperatures resulting in large proportions of fused fibers are to be avoided since this offsets many of the advantages of the present invention. It is necessary, therefore, to closely control the temperature so that it will be within the range specified and preferably within the upper portion of the range.

After the fibrous glass is at the critical temperature, it may be shaped by means of molds or may be pressed by pressure members such as coacting rollers exerting relatively low pressures upon the fibrous mass. The pressure required varies with the temperature and the degree of softening of the fibers but is considerably below the pressure required to compact the fibrous glass while cold.

It has been discovered that shaping and compacting the fibrous glass while heated to the temperature indicated produces a novel effect on the fibers in the finished product. When the loose fibrous mass is compressed in any direction, the fibers extending in that direction or having major components in that direction, are buckled and curled by the compressive forces on the fibers. The affected fibers are thus bent around fibers extending angularly thereto and tend to mechanically interlock with these fibers. This arrangement increases the coherence of the molded fibrous mass.

A schematic representation of a portion of a loose fibrous glass mat is illustrated in Figure 3. The fibers extend in more or less haphazard relation. Some of them, for instance the fibers 6 may extend in a generally vertical direction and at an angle to some of the other and generally horizontally extending fibers 7. The fibers are looped and curved to some extent due to the manner in which the long flexible fibers double back and forth as they are deposited on an arresting surface during their formation.

When the mat is heated and molded in accordance with the present invention, and the mat is compressed in a generally vertical direction, the fibers 6 tend to buckle and bend under the compressive force applied thereto in the direction of their length. The bent and buckled fibers hook into and interlock with each other and with the other fibers as indicated at 8 and tend to increase the coherence and felting of the mat. This arrangement of the fibers is represented schematically in Figure 4 where the fibers 6 are illustrated as being buckled and interlocked with the other fibers in the mat. The bends and loops in the buckled fibers are more pronounced than those resulting from the fiber forming operation.

The fibers that are hooked into and interlocked with each other impart sufficient coherence to the mat for certain uses but a small amount of binding material is preferably usually employed. The binding material need be present in amounts only sufficient to bind the fibers in place at their hooked and interlocked junctures 8. This prevents undue movement of the fibers at these points and increases the rigidity of the mass. The use of smaller quantities of or no binding material in the finished product retains in full or in large measure, the porosity, heat insulating value, and other properties of the pure fibrous material.

The apparatus illustrated in Figures 1 and 2 is adapted to carry out the method of the present invention and comprises an oven 10 divided by a transversely extending wall 11 into chambers 12, 13. The chamber 12 is arranged to be heated by means of burners 15 communicating with the interior of the oven through ports 16 in the side walls thereof. A blower 17 driven by an electric motor 18 is arranged to circulate air through the chamber 12, and has its outlet port connected by means of a conduit 20 with an opening 21 in the upper wall of the chamber. An opening 22 in the lower portion of one of the side walls of the chamber 12 is connected by a conduit 23 with the intake port of the blower. The air circulating downwardly through the chamber 12 is heated by the burners 15 and, if desired, may be additionally heated by auxiliary burners in the conduits 20 and 23.

A foraminous conveyor 30 is provided in the chamber 12 and extends substantially entirely across the width of the chamber. The upper flight of the conveyor extends horizontally lengthwise of the chamber from an infeeding opening 31 in the front wall of the oven to an opening 32 in the central wall 11. The conveyor passes about rollers 33, 34 at the respective ends of the chamber 12 and over intermediate rolls 36, 37, either or both of which may be adjustable to permit adjusting of the tension on the conveyor. The upper flight of the conveyor is supported intermediate the rollers 33, 34 on aligned rollers 38.

The chamber 13 is heated by means of burners 40 directed through ports 42 in the side walls of the oven. Air heated by the burners is circulated through the chamber 13 by a blower 45 driven by an electric motor 46. The blower has its inlet port connected by a conduit 47 with an opening 48 in the upper wall of the chamber, and has its outlet port connected by a conduit 49 with an opening 51 in the lower portion of the side wall of the chamber, so that the air circulated by the blower 45 passes in an upward direction through the chamber 13.

A series of rollers 55 are arranged in alignment in a horizontal plane extending across the chamber 13, with their surfaces preferably tangential to and beneath the plane in which the upper surface of the conveyor 30 is located. The rollers 55 are supported on shafts 56 journaled in bearings 57 suitably supported at the outside of the oven.

A compressing roller 60 is located in the chamber 13 vertically above and in axial alignment with one of the rollers 55. A plurality of aligned rollers 62 may be provided in rear of the roller 60, each being located above and in axial alignment with one of the rollers 55. The roller 60 is mounted on a shaft 61 journaled in bearings 64 at the outside of the oven. The bearings 64 are preferably arranged to be adjusted vertically in suitable manner to adjust the roller 60 toward and from its coacting roller 55. The rollers 62 are mounted on shafts 66 which may be journaled in suitable bearings at the outside of the oven, these bearings being also preferably adjustable vertically to allow adjustment thereof toward and from the rollers 55.

Loose fibrous glass in the form of a continuous mat or, if desired, in the form of separate bats, is fed by means of a conveyor 70, or by other suitable means, in through the opening 31 in the forward wall of the oven and onto the conveyor 30. The mat is preferably a substantially wide web of loose fibrous glass that extends substantially entirely across the oven so that as it is carried on the upper flight of the conveyor 30 through the chamber 12 and on the rollers 55 through the chamber 13 the greater portion of the air passing through each chamber is caused to pass transversely through the fibrous mass. A roller 71 located adjacent the front wall of the oven and suitably journaled to be vertically adjustable is arranged to contact the upper face of the mat to seal the opening 31. As the mat moves through the chamber 12 it is heated by the hot air passing through the chamber and downwardly through the mat to a point approaching but short of the temperature to which it is desired to finally heat the fibrous glass.

After leaving the chamber 12 the mat enters the chamber 13 and is fed therethrough by the rollers 55. A roller 72 rotatably mounted in a manner to be vertically adjustable is positioned adjacent the wall 11. The roller contacts the upper face of the mat and acts to seal the opening 32. The temperature of the mat is increased in the chamber 13 to the final temperature at which it is desired to compress or otherwise shape the mat.

After being brought to this temperature, the mat passes beneath the roller 60, which has been set a predetermined distance from its coacting roller 55, and is thereby compressed and reduced to a sheet of the thickness required. The compressed sheet then moves between the rollers 62, 55 and out of the chamber 13. The mat is thus permitted to cool in compressed form.

Suitable means are employed to drive the roller 60 and the rollers 55 to cause them to feed the mat through the chamber 13. Such means may be, for instance, electric motors having suitable driving connection with sprocket wheels 73, 74 respectively on the shafts 61, 56. The rollers 62 may be driven in similar manner.

The rollers 62 are provided to assist feeding the sheet through the chamber 13 and are not required in the present instance to maintain the compact relation of the sheet and may be dispensed with if desired. The mat is conveyed from the oven on a conveyor 76 or by other suitable means and may be subsequently treated in any desired manner, as by having lubricant or binding material applied thereto and then cut up to form bats or similar products.

The chambers 12 and 13 and the air circulating therethrough are heated to temperatures required for the type of glass present in the mat. For example, when processing fibrous glass of a certain composition, the chamber 12 may be heated to approximately 1150° F. and the chamber 13 may be heated to approximately 1250° F. The two chambers are employed to provide more accurate and ready control of the heating since it has been found that if the glass is heated in the first chamber to just short of the desired temperature a more accurate control of the temperature in the second chamber may be maintained. Further, the temperature of the first chamber need not be maintained within narrow limits, so that expensive control equipment is not required for that chamber. If desired or found necessary only one chamber may be employed or more than two chambers may be provided depending upon the rate of production and similar considerations.

Passing the heated air downwardly through the first chamber permits greater speed and volume of the air since the mat is supported against downward movement by the conveyor. The major portion of the heating may be thus accomplished in the first chamber. The air in the second chamber is passed upwardly through the mat to assure uniformity of temperature of the mat. Since a small portion of the heating need only be effected in the second chamber, the speed and volume of the heated air may be maintained below that tending to lift the mat from the supporting rollers in the second chamber.

In the production of insulating boards by the method of the invention, glass wool of from 1½ to 3 pounds per cubic foot density may be heated and molded as herein described. These densities are those resulting most commonly from the commercial production of glass wool but the invention is, of course, not to be considered as limited thereto. The glass wool is fed into the heated oven in the form of mats or bats of a thickness sufficient to provide a finished board of desired dimensions and density.

To form a glass wool board of 12 pounds per cubic foot density, a mat of glass wool of 1½ pounds density and 8 inches thick, for example, may be heated and molded in accordance with the present invention to form a finished sheet 1 inch thick and of 12 pounds density. This sheet is sufficiently coherent to maintain its form during handling without the aid of binding material due to the manner in which the fibers in the molded sheet are deformed and interlocked as previously described. It is resilient and flexible because the fibers themselves are not fused together but are relatively movable.

Various other sizes and shapes of molded fibrous glass may be made having widely different densities, the densities obtainable being substantially unlimited, since the force required in the present method to compress the fibrous glass is only a fraction of that required to compact the fibrous material when cold.

Heating the glass to the temperatures of the present invention serves an additional useful purpose. Any oil or other organic adventitious matter that is present in the mat is burned out at these temperatures so that the fibres are, in effect, heat-cleaned. Due either to the heat-cleaning or to some other phenomena, the glass fiber surfaces are apparently more receptive to treating and binding materials such as oil, bentonite, phenol formaldehyde, and the like, thereby increasing the effectiveness of application of these materials.

Various modifications may be resorted to within the spirt and scope of the appended claims.

I claim:

1. The method of producing resilient, tough, dense mineral fiber products, which comprises continuously passsing a loose mat of substantial width and composed of long, fine mineral fibers into a heated zone and onto a support, passing heated air through said mat in a direction urging said mat toward the support to initially heat the fibers to a temperature approaching but short of the softening temperature at which the fibers are capable of taking a permanent set when deformed but below that at which the fibers fuse together at their junctures, then passing heated air through said mat in the opposite direction to heat the fibers in the mat to the said softening temperature, passing said mat while at said temperature beneath a compressing roller to compress the mat in a direction transverse to its major faces and thereby compact said mat and reduce the thickness thereof, and passing the compacted mat out of said heated zone to permit it to cool in compacted relation.

2. The method of producing mineral fiber products, which comprises passing a current of heated air through a loose mat of long, fine glass fibers supported on a conveyor, in a direction transverse to its major faces and to urge the mat toward the conveyor to heat the fibers to a temperature approaching but short of the softening temperature at which the fibers are capable of taking a permanent set when deformed, then passing a second current of air heated to a higher temperature than said first-named current of air through said mat in a direction opposite to the movement of said first-named current, to thereby heat the fibers in the mat to the said softening temperature, shaping said mat while at said temperature to desired configuration, and cooling the shaped mat.

3. The process of producing resilient, dense boards of fibrous glass which comprises passing heated air through a loose, fluffy mass of glass fibers supported on a conveyor in a direction to urge the mass against the conveyor and heating the fibers to a temperature approaching but short of the softening temperature at which the fibers will take a permanent set when deformed but will not fuse together, then passing heated air through the mass in the opposite direction and raising the temperature of the fibers to the said softening temperature of the glass, and compacting the mass of fibrous glass while at the latter temperature.

HOWARD W. COLLINS.